US011479097B2

(12) United States Patent
Ryu et al.

(10) Patent No.: US 11,479,097 B2
(45) Date of Patent: Oct. 25, 2022

(54) BODY WEATHER STRIP FOR VEHICLE

(71) Applicants: Hyundai Motor Company, Seoul (KR); Kia Motors Corporation, Seoul (KR); DRB Holding Co., Ltd., Busan (KR)

(72) Inventors: Min Han Ryu, Seoul (KR); Bo Ram Kang, Hwaseong-si (KR); Gi Soo Jang, Suwon-si (KR); Kon Kim, Hwaseong-si (KR); Young Kun Hong, Busan (KR)

(73) Assignees: Hyundai Motor Company, Seoul (KR); Kia Motors Corporation, Seoul (KR); DRB Holding Co., Ltd., Busan (KR)

( * ) Notice: Subject to any disclaimer, the term of this patent is extended or adjusted under 35 U.S.C. 154(b) by 125 days.

(21) Appl. No.: 16/811,186

(22) Filed: Mar. 6, 2020

(65) Prior Publication Data
US 2021/0046811 A1 Feb. 18, 2021

(30) Foreign Application Priority Data
Aug. 12, 2019 (KR) .................. 10-2019-0098152

(51) Int. Cl.
E06B 7/22 (2006.01)
B60J 10/18 (2016.01)
B60J 10/50 (2016.01)
B60J 10/80 (2016.01)
B60J 10/24 (2016.01)

(52) U.S. Cl.
CPC .............. B60J 10/18 (2016.02); B60J 10/24 (2016.02); B60J 10/50 (2016.02); B60J 10/80 (2016.02)

(58) Field of Classification Search
CPC ... B60J 10/15; B60J 10/18; B60J 10/50; B60J 10/80; B60J 10/24; B60J 10/84; B60J 10/86; B60R 16/03; B60Y 2306/09; B60Y 2400/303; B60Y 2400/302
USPC ........................................... 49/498.1
See application file for complete search history.

(56) References Cited

U.S. PATENT DOCUMENTS

| | | | | |
|---|---|---|---|---|
| 3,969,572 A * | 7/1976 | Rostek | ................. | H05K 9/0015 174/353 |
| 4,857,668 A * | 8/1989 | Buonanno | ............ | H05K 9/0015 174/354 |
| 5,045,635 A * | 9/1991 | Kaplo | .................. | H05K 9/0015 174/354 |
| 6,075,205 A * | 6/2000 | Zhang | .................. | H05K 9/0015 174/358 |
| 6,410,137 B1 * | 6/2002 | Bunyan | .................... | C08K 5/06 428/356 |
| 6,525,267 B1 * | 2/2003 | Worley | .................. | F16J 15/024 174/370 |

(Continued)

FOREIGN PATENT DOCUMENTS

KR 20160028257 A 3/2016

Primary Examiner — Jerry E Redman
(74) Attorney, Agent, or Firm — Slater Matsil, LLP

(57) ABSTRACT

A body weather strip for a vehicle includes a carrier part coupled by being fitted in a car body panel and a tube part integrally formed with the carrier part and configured to perform a function when coming in contact with a door panel. A conductive coating agent is applied to the tube part and an external power is connected to the conductive coating agent.

17 Claims, 3 Drawing Sheets

(56) References Cited

U.S. PATENT DOCUMENTS

| | | | |
|---|---|---|---|
| 6,541,698 B2 * | 4/2003 | Miska | H05K 9/0015 174/358 |
| 7,456,365 B2 * | 11/2008 | Gilliland | F16J 15/064 174/356 |
| 7,470,866 B2 * | 12/2008 | Dietrich | H05K 9/0015 174/356 |
| 7,718,251 B2 * | 5/2010 | Huntress | B29C 65/562 428/304.4 |
| 7,732,714 B2 * | 6/2010 | Hammaker | F16J 15/104 174/357 |
| 9,980,417 B1 * | 5/2018 | Ji | H05K 9/0015 |
| 10,595,451 B1 * | 3/2020 | Wang | H05K 1/0216 |
| 10,822,842 B2 * | 11/2020 | Salter | E05B 81/12 |
| 2002/0144466 A1 * | 10/2002 | Gopalan | B60J 10/17 49/475.1 |
| 2002/0152686 A1 * | 10/2002 | Whitehead | B60J 10/80 49/475.1 |
| 2002/0152687 A1 * | 10/2002 | Willett | B60J 10/265 49/475.1 |
| 2005/0017460 A1 * | 1/2005 | Hofmann | B60J 10/00 277/628 |
| 2005/0048263 A1 * | 3/2005 | Ford | B60J 10/273 428/143 |
| 2007/0063539 A1 * | 3/2007 | DiMario | B60J 1/10 296/146.15 |
| 2012/0138589 A1 * | 6/2012 | Mitchell | C09D 7/65 219/202 |
| 2014/0034633 A1 * | 2/2014 | Heintz | H01C 17/065 219/525 |
| 2014/0339842 A1 * | 11/2014 | Kawaguchi | B60J 5/0495 296/1.04 |
| 2015/0267457 A1 * | 9/2015 | Matsumoto | B29C 45/14467 73/862.541 |
| 2017/0034960 A1 * | 2/2017 | Ham | G02F 1/133308 |
| 2018/0257308 A1 * | 9/2018 | Ahmad | B29C 65/1425 |
| 2019/0061501 A1 * | 2/2019 | Tanaka | B60J 10/24 |
| 2019/0168592 A1 * | 6/2019 | Baskar | B60J 10/40 |
| 2020/0411214 A1 * | 12/2020 | Sase | B32B 27/36 |
| 2021/0002941 A1 * | 1/2021 | Akimoto | E05F 15/443 |
| 2021/0021178 A1 * | 1/2021 | Maruyama | E05F 15/44 |
| 2021/0046811 A1 * | 2/2021 | Ryu | B60J 10/80 |
| 2021/0107340 A1 * | 4/2021 | Ishibashi | B60J 10/24 |
| 2021/0109246 A1 * | 4/2021 | Matsumoto | B60J 5/0493 |

* cited by examiner

BODY WEATHER STRIP FOR VEHICLE

CROSS-REFERENCE TO RELATED APPLICATIONS

This application claims priority to Korean Patent Application No. 10-2019-0098152, filed in the Korean Intellectual Property Office on Aug. 12, 2019, which application is hereby incorporated herein by reference.

TECHNICAL FIELD

Embodiments relate to a body weather strip for a vehicle.

BACKGROUND

A body weather strip that is used for vehicle is made of a rubber material, in general, fills the gap between a fixed panel (hereafter, referred to as a car body panel) of a car body and a rotary panel (hereafter, referred to as a door panel), and particularly, prevents wind noise and water from entering a vehicle while driving.

However, high hardness of rubber of a body weather strip made of a rubber material (when it is hard, when a compression load is large, when the modulus of elasticity of rubber is low), it is advantageous in terms of the function that prevents wind noise and water from entering a vehicle while driving (functionality during driving), but the reaction is large, so there is a defect that the door panel is not closed well or a large noise is generated when the door panel is opened (problem of static closing force in stop).

Further, when the hardness of the rubber is low (when it is soft, when a compression load is small, when the modulus of elasticity of rubber is high), the reaction is small, so it is advantage when the door panel is opened and closed, but there is a defect that the function that prevents wind noise and water from entering a vehicle while driving (functionality during driving) is deteriorated.

As described above, the body weather strip made of a rubber material in the related art shows an opposite character in functionality during driving (function that prevents wind noise and water from entering a vehicle while driving) and static closing force in stop (function that makes a door panel open and close well and reduces noise), so there is a defect that it is difficult to satisfy both of the functions.

The description provided above as a related art of the present disclosure is just for helping understanding the background of the present disclosure and should not be construed as being included in the related art known by those skilled in the art.

SUMMARY

Embodiments relate to a body weather strip for a vehicle and particular embodiment relate to a body weather strip for a vehicle in which hardness of rubber is changed by electrical conduction in accordance with changes in the traveling speed of a vehicle and external air temperature.

Embodiments of the present disclosure provide a body weather strip for a vehicle in which hardness of rubber is changed by electrical conduction in accordance with changes in the traveling speed of a vehicle and external air temperature, that is, which increases hardness of rubber to be advantageous in terms of the function that prevents wind noise and water from entering a vehicle while driving and which decreases hardness of rubber to reduce a reaction such that a door panel is opened and closed well, particularly, noise that is generated when a door panel is opened is reduced.

Further, embodiments can prevent deterioration of the characteristics of rubber in a low-temperature environment by decreasing hardness by applying heat to rubber through electric conduction regardless of the traveling speed of a vehicle when the temperature of external air drops under a reference temperature.

In view of an aspect, a body weather strip for a vehicle according to an embodiment of the present disclosure includes a carrier part coupled by being fitted in a car body panel, a tube part integrally formed with the carrier part and performing a function when coming in contact with a door panel, and a conductive coating agent applied to the tube part, in which an external power is connected to the conductive coating agent.

The conductive coating agent is a coating agent in which a urethane coating agent for securing a friction and wear ability, a carbon nanotube for securing conductivity, and a hardener for securing hardness are mixed.

The body weather strip further includes: a conductive wire inserted in the tube part; and an electric wire connected with the conductive wire.

The conductive wire may be a copper wire that can secure stable resistance and current flow and is excellent in terms of thermal conductivity and heat generation.

The electrical wire is connected with the conductive wire through the inside of the carrier part such that exposure of the electrical wire to the outside is prevented.

A joint formed in the same shape as the body weather strip having the carrier part and the tube part is configured to be integrated with the body weather strip by being coupled to a side of the body weather strip, and the electrical wire is connected with the conductive wire through the joint such that exposure of the electrical wire to the outside is prevented.

The electrical wire is connected with a power, and the power is configured such that an operation thereof is controlled by a controller that receives signals from a vehicle speed sensor and an external air temperature sensor.

When a vehicle speed of a vehicle that is being driven become a vehicle speed at which wind noise starts to be louder than road noise, the controller controls a current to be supplied to the conductive wire, and the tube part applied with the coating agent increases in volume and pressure through heat generation by electrical conduction when a current is supplied to the conductive wire such that the hardness of the rubber increases.

When external air temperature drops under, the controller controls a current to be supplied to the conductive wire regardless of a vehicle speed, and the tube part applied with the coating agent increases in volume and pressure through heat generation by electrical conduction when a current is supplied to the conductive wire such that the hardness of the rubber increases.

In view of another aspect, a body weather strip for a vehicle according to an embodiment of the present disclosure includes a carrier part coupled by being fitted in a car body panel and a tube part integrally formed with the carrier part, performing a function when coming in contact with a door panel, and configured to be able to be supplied with a current from an external power, in which when a current is supplied to the tube part, the tube part increases in volume and pressure through heat generation such that hardness of rubber increases.

The body weather strip for a vehicle according to an embodiment of the present disclosure is configured such that a conductive coating agent is applied and a conducive wire is coupled to a tube part that performs a function when coming in contact with a door panel, so rubber hardness of the tube part is maintained at a low level such that a reaction decreases to be advantageous for opening and closing the door panel when a vehicle is stopped, and particularly, it is possible to further improve a function that can reduce noise that is generated when the door panel is opened.

Further, when a vehicle is driven at a high speed, a current is supplied to the conductive wire to induce heat generation of the tube part through the conductive coating agent and to induce an increase in volume and pressure due to heat generation of the tube part such that rubber hardness increases. Accordingly, it is possible to further improve a function that prevents wind noise and water from entering a vehicle.

Further, when external air temperature drops under a reference temperature, a current is supplied to the conductive wire regardless of the traveling speed of the vehicle such that rubber hardness of the tube part decreases. Accordingly, the present disclosure has an effect in that it is possible to prevent a situation in which the characteristics of rubber of the weather strip are deteriorated in a low-temperature environment.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF ILLUSTRATIVE EMBODIMENTS

Figure 1:
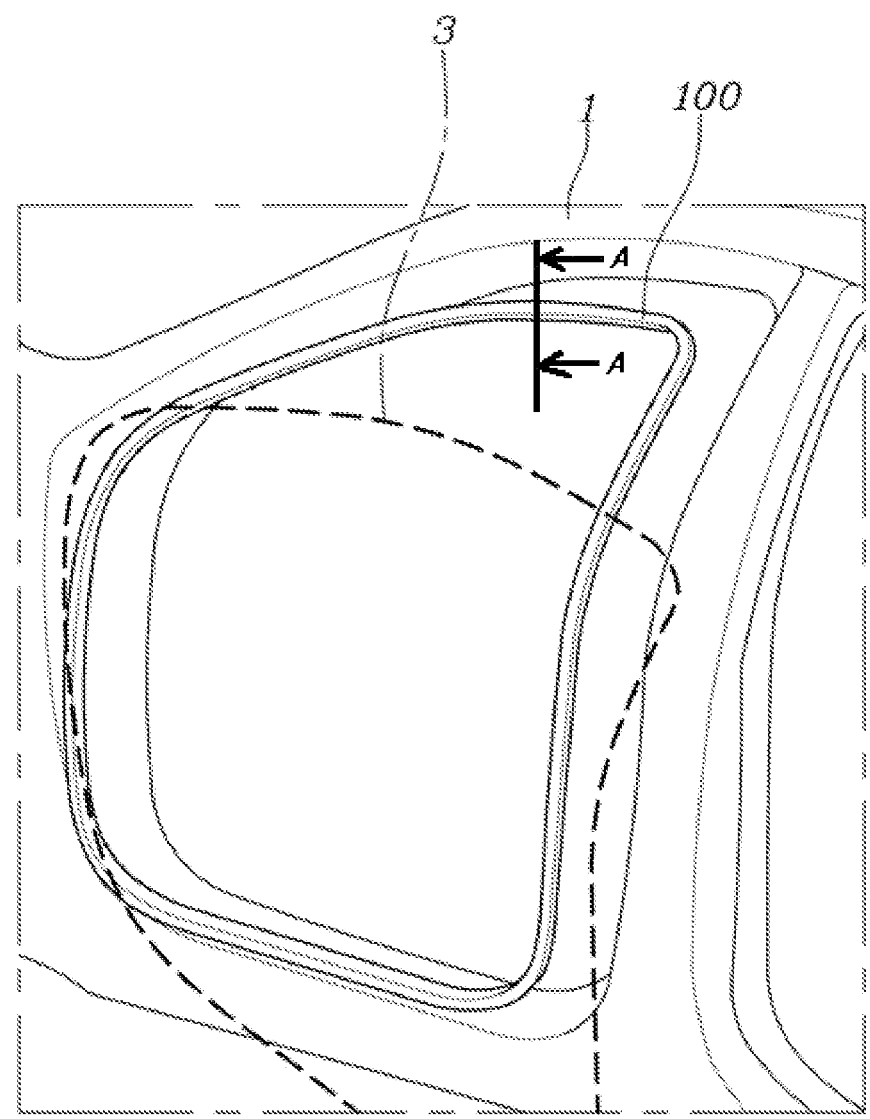
FIG. 1 is a perspective view showing the portion where a body weather strip according to the present disclosure has been installed.

A body weather strip for a vehicle according exemplary embodiments of the present disclosure is described hereafter in detail with reference to the accompanying drawings.

A body weather strip 100 for a vehicle according to the present disclosure, as shown in FIGS. 1 to 4, includes a carrier part 110 coupled by being fitted in a car body panel 1, a tube part 120 integrally formed with the carrier part 110 and performing a function when coming in contact with a door panel 3, and a conductive coating agent 130 applied to the tube part 120, in which an external power is connected to the conductive coating agent 130.

The carrier part 110 has to maintain the shape in the state in which it is fitted in the car body panel 1, so sufficient strength and rigidity should be secured, and to this end, a core 140 made of steel is inserted inside the carrier part 110.

The body weather strip 100 is made of a rubber material and the tube part 120 prevents wind noise and water from entering a vehicle while driving through contact with the door panel 3 (functionality during driving) and minimizes noise generation while making the door panel 3 open or close well in stop (static closing force in stop).

The body weather strip 100 according to the present disclosure is designed to fundamentally show excellent a static closing force function.

That is, the body weather strip 100 made of a rubber material is designed fundamentally such that hardness of the rubber of the tube part 120 is low (when it is soft, when a compression load is small, when the modulus of elasticity of rubber is high), so a reaction of the tube part 120 is small, which is advantageous for opening and closing the door panel 3, and particularly, is designed to be capable of reducing noise that is generated when the door panel 3 is opened.

When the rubber hardness of the tube part 120 is low, it is advantageous in terms of the function of static closing force in stop, but the function (functionality during driving) that prevents wind noise and water from entering a vehicle while driving is deteriorated. Accordingly, an embodiment according to the present disclosure is configured to be capable of increasing rubber hardness of the tube part 120 when a vehicle speed is over a predetermined vehicle speed in order to improve functionality during driving, and to this end, is characterized in that the conductive coating agent 130 is applied to the tube part 120 and an external power is connected to the conductive coating agent 130.

Describing in detail the configuration of the present disclosure, a coating agent in which a urethane coating agent 131 for securing a friction and wear ability for rubber, a carbon nanotube (CNT) 132 for securing conductivity, and a hardener 133 for securing hardness are mixed is used for the conductive coating agent 130.

There are various additives showing electrical conductivity, but the carbon nanotube 132 is used as a material having high conductivity without deteriorating rubber characteristics and the characteristics of a urethane-based material that is a coating agent, and the carbon nanotube 132 and the hardener 133 are mixed with the existing urethane coating agent 131 at an appropriate ratio.

As the result of repeated tests using various optimal contents of the carbon nanotube 132 to have wear resistance and hardness the same as existing coating agents and to generate heat up to a desired temperature, it was found that it was good that the content of the carbon nanotube 132 was in the range of 2% by weight to 6% by weight, and more detail, it was good to produce the conductive coating agent 130 with the content of 4% of the carbon nanotube 132, and the heat generation temperature increased over 90° C.

Further, an embodiment of the present disclosure further includes a conductive wire 150 inserted in the tube part 120, and an electric wire 160 connected with the conductive wire 150, and a copper wire that can secure stable resistance and current flow and is excellent in terms of thermal conductivity and heat generation may be used for the conductive wire 150, but the present disclosure is not limited thereto.

When a current is supplied to the conductive wire 150 through the electric wire 160 connected with external power, the tube part 120 applied with the conductive coating agent 130 increases in volume and pressure through heat generation by electrical conduction. Accordingly, the tube part 120 changes into a state with high hardness of rubber (a hard state, a state with large compression load, a state with a low modulus of elasticity of rubber).

Accordingly, when the rubber hardness of the tube part 120 is increased by heat generation of the tube part 120, it is possible to further improve the function (functionality during driving) that prevents wind noise and water from entering a vehicle at a predetermined vehicle speed or more.

In accordance with the present disclosure, the electric wire 160 connected with the conductive wire 150 is connected with a power 171, the power 171 is connected with a controller 172 and configured to be operated by control of the controller 172, and the controller 172 is configured to receive signals from a vehicle speed sensor 173 and an external air temperature senor 174, that is, the controller 172 is configured to control the operation of the power 171 in response to signals that are input from the vehicle speed sensor 173 and the external air temperature senor 174.

For example, when the vehicle speed of a vehicle that is being driven become a vehicle speed (100 Km/h, high-speed traveling) at which wind noise starts to be louder than road noise, the controller 172 that receives a signal from the vehicle sensor 173 controls the operation of the power 171 such that a current is supplied to the conductive wire 150. Accordingly, the tube part 120 applied with the coating agent 130 increases in volume and pressure through heat generation by electrical conduction when a current is supplied to the conductive wire 150, so the hardness of the rubber increases. Therefore, it is possible to further improve the function (functionality during driving) that prevents wind noise and water from entering a vehicle at a predetermined vehicle speed or more.

As another example, when external air temperature becomes a temperature (e.g., minus 10° C. or less) in a situation in which the characteristics of rubber are deteriorated in a low-temperature environment, the controller 172 that receives a signal from the external air temperature senor 174 controls the operation of the power 171 such that a current is supplied to the conductive wire 150 regardless of the vehicle speed of the vehicle. Accordingly, the tube part 120 applied with the coating agent 130 increases in volume and pressure through heat generation by electrical conduction when a current is supplied to the conductive wire 150, so the hardness of the rubber increases. Therefore, it is possible to prevent a situation in which the characteristics of rubber of the weather strip 100 are deteriorated in a low-temperature environment.

Figure 2:
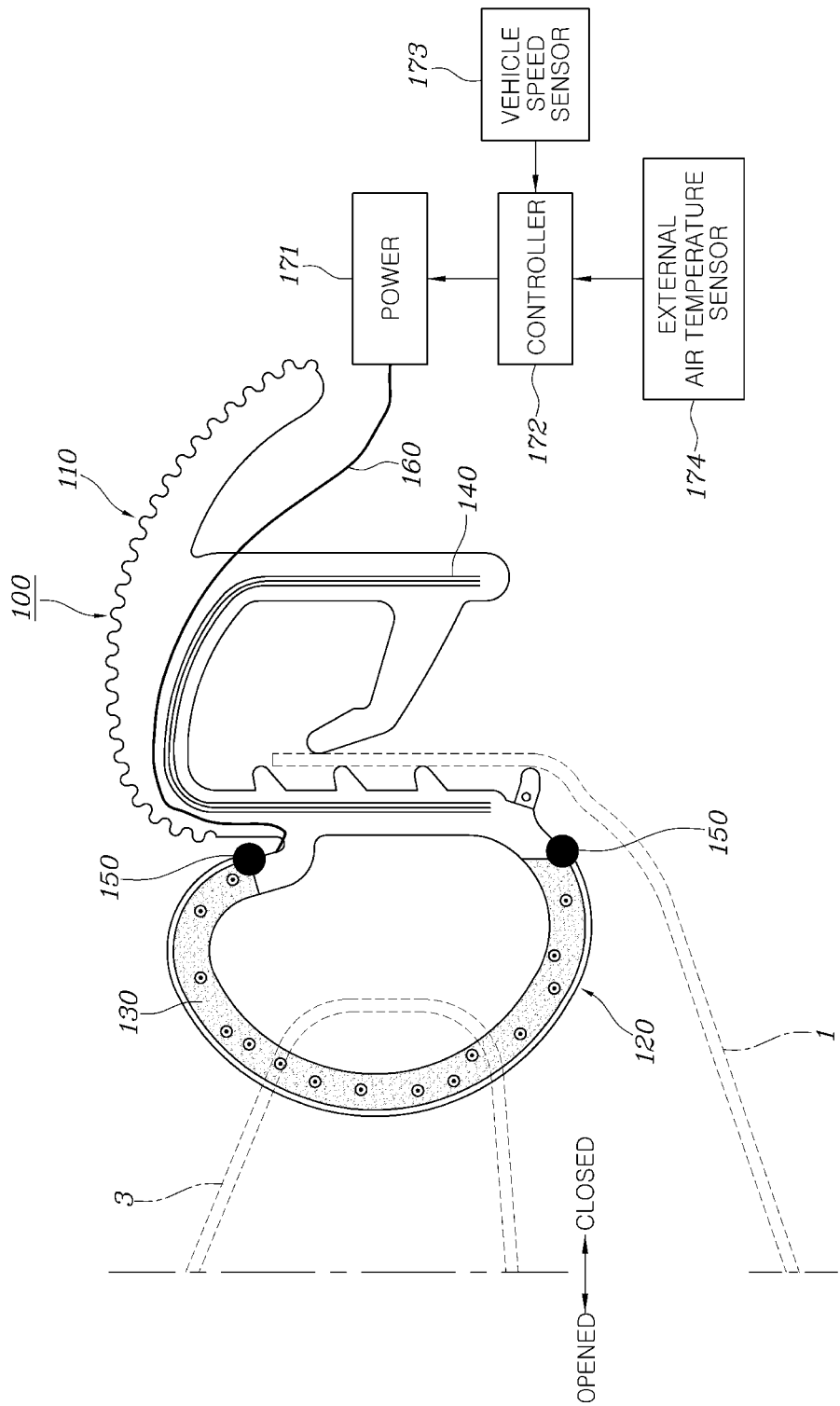
FIG. 2 is a cross-sectional view taken along the A-A line in FIG. 1 of the body weather strip for a vehicle according to the present disclosure.
Figure 3:
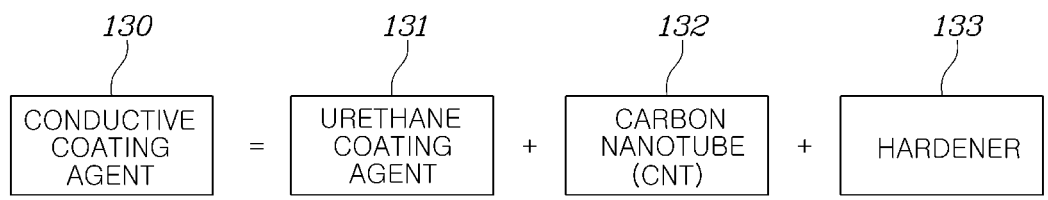
FIG. 3 is a view for describing the components of a conductive coating agent according to the present disclosure.

On the other hand, the electrical wire 160 may be configured to be connected with the conductive wire 150 through the inside of the carrier part 110, as shown in FIG. 2, and accordingly, it is possible to maximally prevent exposure of the electrical wire 160 to the outside, thereby being capable of improving external appearance.

Figure 4:
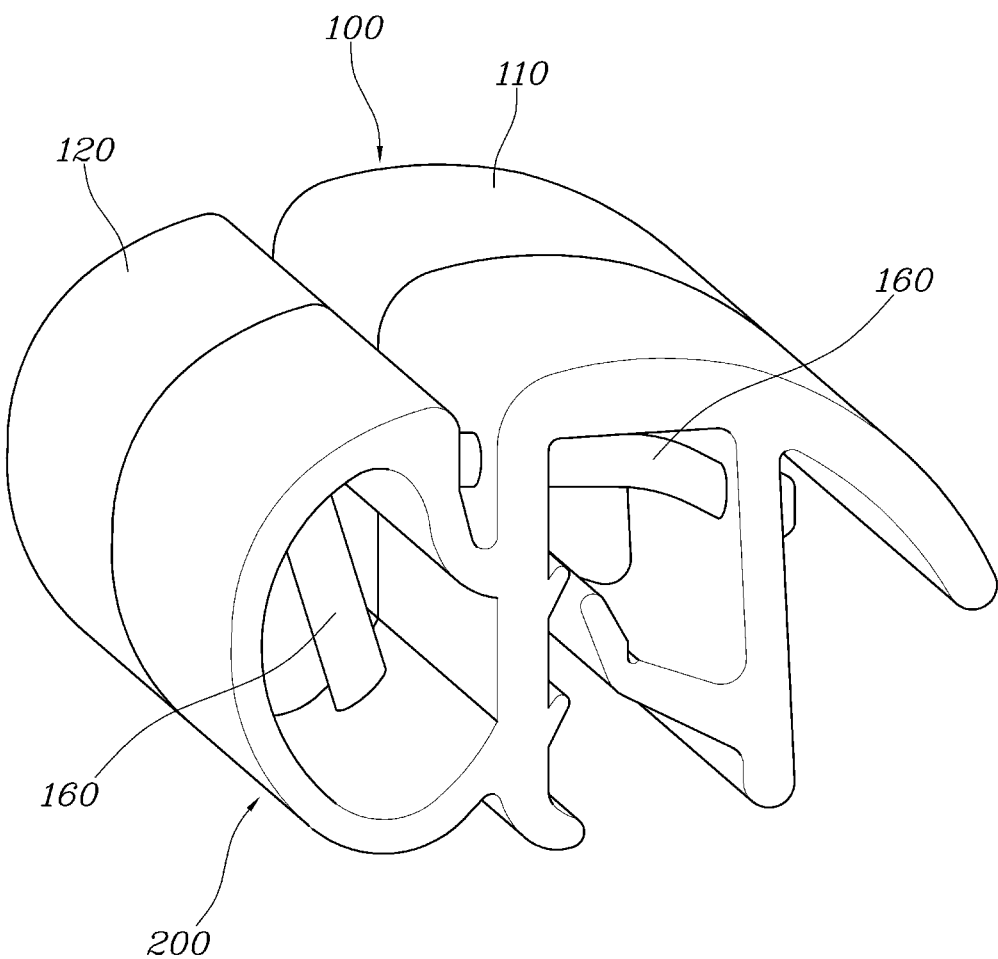
FIG. 4 is a view for describing a joint coupled to the body weather strip in accordance with the present disclosure.

As another example, as shown in FIG. 4, a joint 200 formed in the same shape as the body weather strip 100 having the carrier part 110 and the tube part 120 may be configured to be integrated with the body weather strip 100 by being coupled to a side of the body weather strip 100. In this case, the electrical wire 160 is configured to be connected with the conductive wire 150 through the joint 200. Accordingly, it is possible to maximally prevent exposure of the electrical wire 160 to the outside using the joint 200, so the external appearance can be improved.

As described above, according to the body weather strip for a vehicle of an embodiment of the present disclosure, the conductive coating agent 130 is applied to the tube pall 120, which performs a function when it comes in contact with the door panel 3, and the conductive wire 150 is coupled. Accordingly, a reaction is reduced when the vehicle is stopped by maintaining the rubber hardness of the tube pall 120 at a low level to be advantageous in terms of opening and closing the door panel 3. In particular, there is an advantage in that it is possible to further improve the function (static closing force in stop) that can reduce noise that is generated when the door panel 3 is opened.

Further, when the vehicle is driven at a high speed, heat generation of the tube part 120 is induced through the conductive coating agent 130 by supplying a current to the conductive wire 150, and an increase in volume and pressure is induced through heat generation of the tube part 120 such that the rubber hardness increases. Accordingly, there is an advantage in that it is possible to further improve the function (functionality during driving) that prevents wind noise and water from entering the vehicle.

Further, when external air temperature drops under a reference temperature, a current is supplied to the conductive wire 150 regardless of the traveling speed of the vehicle such that rubber hardness of the tube part 120 decreases. Accordingly, the present disclosure has another advantage in that it is possible to prevent a situation in which the characteristics of rubber of the weather strip wo are deteriorated in a low-temperature environment.

Although the present disclosure was described with reference to specific embodiments shown in the drawings, it is apparent to those skilled in the art that the present disclosure may be changed and modified in various ways without departing from the scope of the present disclosure, which is described in the following claims.

What is claimed is:

1. A body weather strip for a vehicle, the body weather strip comprising:
   a carrier part coupled by being fitted in a car body panel such that the carrier part is shaped to surround a portion of the car body panel;
   a tube part integrally formed with the carrier part such that the tube part faces the carrier part with respect to the surrounded portion of the car body panel, the tube part configured to perform a function when coming in contact with a door panel;
   a conductive coating agent applied to the tube part, wherein an external power is connected to the conductive coating agent;
   a conductive wire inserted in the tube part; and
   an electric wire connected with the conductive wire, wherein the electrical wire is connected with a power supply that is configured such that an operation of the power supply is controlled by a controller that receives signals from a vehicle speed sensor and an external air temperature sensor.

2. The body weather strip of claim 1, wherein the conductive coating agent includes a urethane coating agent, a carbon nanotube, and a hardener.

3. The body weather strip of claim 2, wherein the urethane coating agent is for securing a friction and wear ability, the carbon nanotube is for securing conductivity, and the hardener is for securing hardness.

4. The body weather strip of claim 1, wherein the conductive wire is a copper.

5. The body weather strip of claim 4, wherein the conductive wire is thermally conductive.

6. The body weather strip of claim 1, wherein the electrical wire is connected with the conductive wire through an inside of the carrier part such that exposure of the electrical wire to the outside is prevented.

7. The body weather strip of claim 1, wherein a joint formed in the same shape as the body weather strip having the carrier part and the tube part are configured to be integrated with the body weather strip by being coupled to a side of the body weather strip; and the electrical wire is connected with the conductive wire through the joint such that exposure of the electrical wire to the outside is prevented.

8. The body weather strip of claim 1, wherein the body weather strip is configured so that when a vehicle speed of the vehicle that is being driven becomes a vehicle speed at which wind noise starts to be louder than road noise, the controller controls a current to be supplied to the conductive wire so that the tube part applied with the coating agent increases in volume and pressure through heat generation by electrical conduction when the current is supplied to the conductive wire such that the hardness of the rubber increases.

9. The body weather strip of claim 1, wherein the body weather strip is configured to that when external air temperature drops under a temperature threshold, the controller controls a current to be supplied to the conductive wire regardless of a vehicle speed so that the tube part applied with the coating agent increases in volume and pressure through heat generation by electrical conduction when the current is supplied to the conductive wire such that the hardness of the rubber increases.

10. A body weather strip for a vehicle, the body weather strip comprising:
a carrier part coupled by being fitted in a car body panel such that the carrier part is shaped to surround a portion of the car body panel;
a tube part integrally formed with the carrier part such that the tube part faces the carrier part with respect to the surrounded portion of the car body panel, the tube part configured to perform a function when coming in contact with a door panel; a conductive coating agent applied to the tube part; a power supply connected to the conductive coating agent;
a conductive wire inserted in the tube part; and
an electric wire connected with the conductive wire;
wherein the tube part is configured to perform a function when coming in contact with a door panel and to be supplied with a current from an external power supply that is configured such that an operation of the external power supply is controlled by a controller that receives signals from a vehicle speed sensor and an external air temperature sensor; and
wherein the tube part is configured so that when the current is supplied to the tube part via the electric wire, the tube part increases in volume and pressure through heat generation such that hardness of rubber increases.

11. The body weather strip of claim 10, wherein the tube part is coated with a conductive coating agent comprising a urethane coating agent, a carbon nanotube, and a hardener.

12. A vehicle comprising:
a car body panel;
a door panel;
a body weather strip that comprises a carrier part fitted in the car body panel and a tube part integrally formed with the carrier part and located to be between the car body panel and the door panel;
a conductive wire located in the tube part of the body weather strip; an electric wire connecting with the conductive wire with the power supply
a sensor disposed adjacent a portion of the vehicle; and
a controller coupled to the sensor and configured to cause a current to flow through the conductive wire based on a signal received from the sensor.

13. The vehicle of claim 12, wherein the sensor comprises a vehicle speed sensor and an external air temperature sensor.

14. The vehicle of claim 12, wherein the conductive coating agent includes a urethane coating agent, a carbon nanotube, and a hardener.

15. The vehicle of claim 12, wherein the controller is configured to cause the current to flow by controlling the current so that the tube part increases in volume and pressure and the hardness of the rubber increases.

16. The vehicle of claim 15 wherein the sensor comprises a noise sensor and wherein the controller is configured to cause the current to flow when wind noise starts to be louder than road noise.

17. The vehicle of claim 15, wherein the sensor comprises a temperature sensor and wherein the controller is configured to cause the current to flow when an external air temperature drops under a temperature threshold.

* * * * *